(12) United States Patent
Qi et al.

(10) Patent No.: US 11,996,553 B2
(45) Date of Patent: May 28, 2024

(54) METHOD OF COATING ELECTROACTIVE MATERIALS WITH CONDUCTIVE POLYMERS

(71) Applicant: GM GLOBAL TECHNOLOGY OPERATIONS LLC, Detroit, MI (US)

(72) Inventors: Gongshin Qi, Troy, MI (US); Jiazhi Hu, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 163 days.

(21) Appl. No.: 17/507,479

(22) Filed: Oct. 21, 2021

(65) Prior Publication Data
US 2023/0129069 A1  Apr. 27, 2023

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/386* (2013.01);
(Continued)

(58) Field of Classification Search
CPC .......... H01M 10/052; H01M 10/0525; H01M 2004/021; H01M 2250/20; H01M 4/0404;
(Continued)

(56) References Cited

U.S. PATENT DOCUMENTS

| 7,087,348 B2* | 8/2006 | Holman ................ | H01M 4/624 204/290.01 |
| 2007/0059901 A1* | 3/2007 | Majumdar ............ | H01G 11/48 438/455 |

(Continued)

FOREIGN PATENT DOCUMENTS

| CN | 116014088 A | 4/2023 |
| DE | 102022122369 A1 | 4/2023 |

OTHER PUBLICATIONS

Xu, Gui-Liang et al.; "Building ultraconformal protective layers on both secondary and primary particles of layered lithium transition metal oxide cathodes"; Nature Energy, vol. 4, Jun. 2019 (pp. 484-494); https://doi.org/10.1038/s41560-019-0387-1.

*Primary Examiner* — Victoria H Lynch
(74) *Attorney, Agent, or Firm* — Harness, Dickey & Pierce, P.L.C.

(57) ABSTRACT

The present disclosure provides a method of preparing a coated electroactive material. The method includes providing a plurality of particles including an electroactive material. The method further includes coating the plurality of particles with a conductive polymer. The coating includes preparing a solution of water and the conductive polymer. The coating further includes forming a slurry by combining the solution with the plurality of particles. The method further includes drying the slurry to form the coated electroactive material. The coated electroactive material includes the plurality of particles. Each of the plurality of particles is at least partially coated with the conductive polymer. In certain aspects, the present disclosure provides a method of preparing an electrode including the coated electroactive material.

20 Claims, 6 Drawing Sheets

(51) Int. Cl.
    *H01M 4/38*         (2006.01)
    *H01M 4/525*      (2010.01)
    *H01M 4/583*      (2010.01)
    *H01M 4/62*         (2006.01)
    *H01M 10/0525*    (2010.01)
    *H01M 4/02*         (2006.01)

(52) U.S. Cl.
    CPC ........... *H01M 4/525* (2013.01); *H01M 4/583* (2013.01); *H01M 4/624* (2013.01); *H01M 10/0525* (2013.01); *H01M 2004/021* (2013.01); *H01M 2250/20* (2013.01)

(58) Field of Classification Search
    CPC .... H01M 4/0471; H01M 4/134; H01M 4/139; H01M 4/1395; H01M 4/366; H01M 4/386; H01M 4/525; H01M 4/583; H01M 4/622; H01M 4/623; H01M 4/624; Y02E 60/10
    See application file for complete search history.

(56) References Cited

U.S. PATENT DOCUMENTS

2018/0047988 A1*   2/2018   Seuring ................... C08L 65/00
2019/0058219 A1*   2/2019   Yang ................. H01M 10/0525

\* cited by examiner

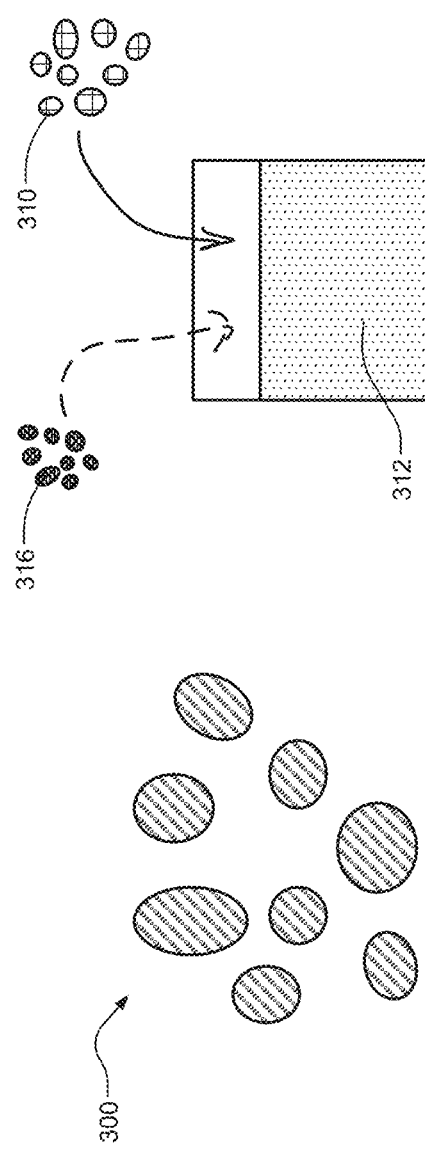
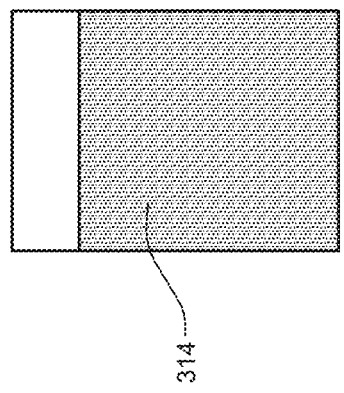
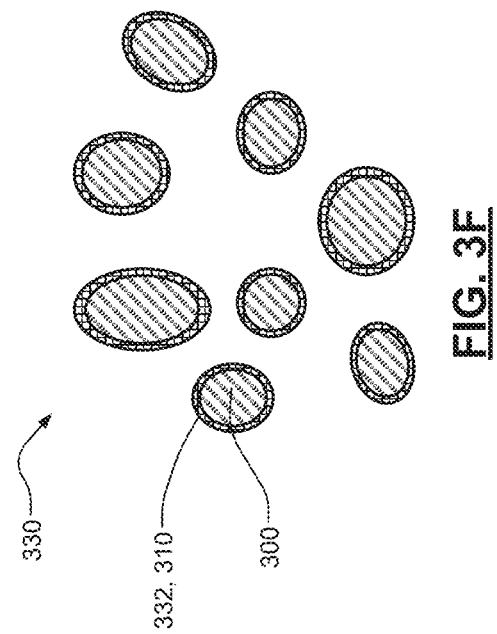
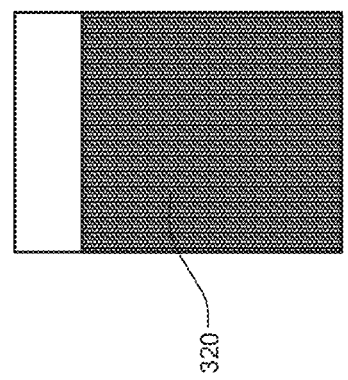
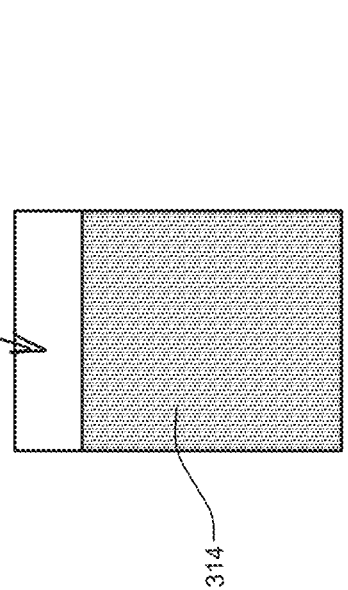
FIG. 3A  FIG. 3B  FIG. 3C  FIG. 3D  FIG. 3E  FIG. 3F

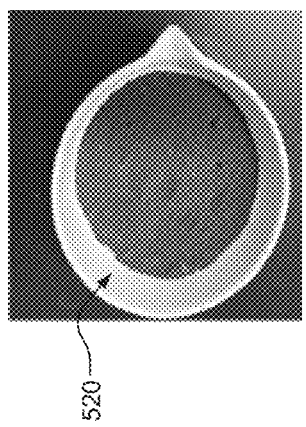
FIG. 5C
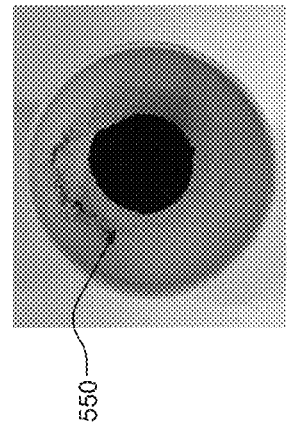
FIG. 5F
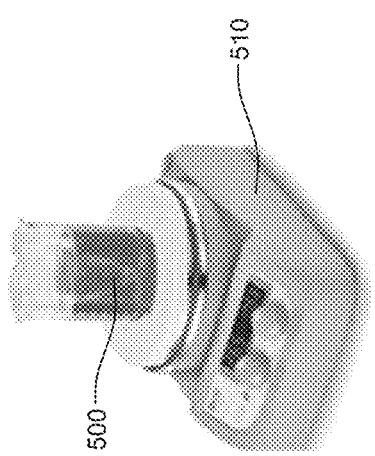
FIG. 5B
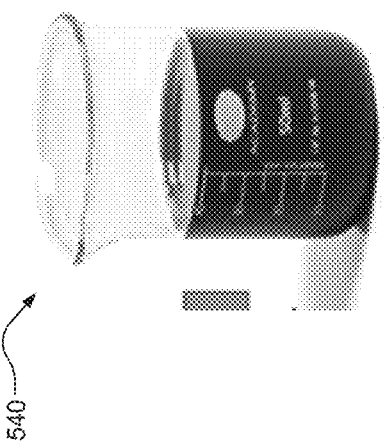
FIG. 5E
FIG. 5A
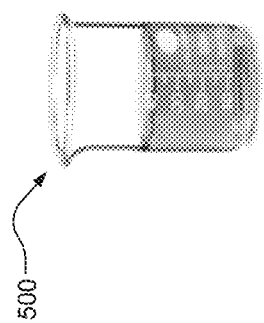
FIG. 5D

METHOD OF COATING ELECTROACTIVE MATERIALS WITH CONDUCTIVE POLYMERS

INTRODUCTION

This section provides background information related to the present disclosure which is not necessarily prior art.

The present disclosure relates to a method of coating electroactive materials with conductive polymers, coated electroactive materials formed by the method, and electrodes including the coated electroactive materials.

High-energy density electrochemical cells, such as lithium-ion batteries can be used in a variety of consumer products and vehicles, such as hybrid or electric vehicles. Battery powered vehicles show promise as a transportation option as technical advances continue to be made in battery power and lifetimes. One factor potentially limiting wider acceptance and use of battery-powered vehicles is the potentially limited driving range, especially in the earlier stages of adoption where charging stations are not yet ubiquitous as gas stations are today. It would be desirable to provide batteries capable of providing longer drive ranges and shorter charge times. In addition, battery-powered vehicles often are required to operate in extreme weather conditions, for example, at low temperatures in northern winter weather.

In the face of these requirements, it has been a challenge to find economical battery chemistries that meet both energy and power requirements. There has long been a need for a battery having a chemistry that avoids or minimizes use of expensive metals, such as cobalt and other noble metals, while providing advantageous power delivery, long driving ranges, and fast charge to enhance widespread use of batteries, especially in vehicles.

SUMMARY

This section provides a general summary of the disclosure, and is not a comprehensive disclosure of its full scope or all of its features.

In various aspects, the present disclosure provides a method of preparing a coated electroactive material. The method includes coating a plurality of particles with a conductive polymer. The coating includes preparing a solution of water and the conductive polymer. The coating further includes forming a slurry by combining the solution with the plurality of particles. The method further includes drying the slurry to form the coated electroactive material. The coated electroactive material includes the plurality of particles. Each of the plurality of particles is at least partially coated with the conductive polymer.

In one aspect, the drying includes spray drying, rotavapor drying, vacuum drying, or a combination thereof.

In one aspect, the method further includes, prior to the drying, concurrently heating and stirring the slurry.

In one aspect, preparing the solution further includes combining an additive with the conductive polymer and the solvent. The additive is configured to increase conductivity, stretchability, or both conductivity and stretchability of the conductive polymer.

In one aspect, the additive is selected from the group consisting of: 1-ethyl-3-methylimidazolium bis(trifluoromethylsulfonyl)imide, bis(trifluoromethane)sulfonimide lithium salt, 4-(3-butyl-1-imidazolio)-1-butanesulfonic acid triflate, diethylene glycol, and combinations thereof.

In one aspect, the providing includes preparing the electroactive material.

In one aspect, the conductive polymer is selected from the group consisting of: polypyrrole, polyaniline, polythiophene, PEDOT, and PEDOT:PSS, copolymers thereof, derivatives thereof, and combinations thereof.

In one aspect, the conductive polymer includes the PEDOT:PSS.

In one aspect, a weight ratio of the PEDOT to the PSS is greater than or equal to about 0.1 to less than or equal to about 10.

In one aspect, a conductivity of the PEDOT:PSS is greater than or equal to about 1 S/cm to less than or equal to about 500 S/cm.

In one aspect, the preparing includes providing the conductive polymer in an amount greater than or equal to about 0.1 weight percent to 30 weight percent of the solution.

In one aspect, the electroactive material is a positive electroactive material selected form the group consisting of: NMC, LLC, LFP, LMFP, NCMA, LMO, and combinations thereof.

In one aspect, the positive electroactive material includes the LLC.

In one aspect, the electroactive material is a negative electroactive material selected from the group consisting of: silicon, silicon monoxide, graphite, and combinations thereof.

In one aspect, a weight ratio of the conductive polymer to the electroactive material is greater than or equal to about 0.01 to less than or equal to about 0.3.

In one aspect, the plurality of particles defines an average particle size of greater than or equal to about 0.05 µm to less than or equal to about 30 µm.

In various aspects, the present disclosure provides a method of preparing a coated electroactive material. The method includes coating a plurality of particles including LLC with PEDOT:PSS. The PEDOT:PSS has a weight ratio of PEDOT to PSS of greater than or equal to about 0.1 to less than or equal to about 10. The coating includes preparing a solution of water and the conductive polymer. The conductive polymer is present in an amount greater than or equal to about 0.1 weight percent to about 30 weight percent of the solution. The coating further includes forming a slurry by combining the solution with the plurality of particles. The coating further includes drying the slurry to form the coated electroactive material. The coated electroactive material includes the plurality of particles. Each of the plurality of particles is at least partially coated with the conductive polymer.

In various aspects, the present disclosure provides a method of preparing an electrode including a coated electroactive material. The method includes preparing the coated electroactive material. The preparing includes providing a plurality of particles including an electroactive material. The method further includes coating the plurality of particles with a conductive polymer. The coating includes preparing a solution of water and the conductive polymer. The coating further includes forming a slurry by combining the solution with the plurality of particles. The coating further includes drying the slurry to form the coated electroactive material. The coated electroactive material includes the plurality of particles. Each of the plurality of particles is at least partially coated with the conductive polymer. The method further includes preparing an electrode including the coated electroactive material.

In various aspects, the conductive polymer is present in the electrode in an amount greater than or equal to about 0.01 weight percent to less than or equal to about 10 weight percent.

In various aspects, the electrode is configured to have a discharged capacity retention of greater than or equal to about 95% after 80 cycles when cycled in an electrochemical cell.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIGS. 3A-3F are schematic illustrations of steps of the method of FIG. 2; FIG. 3A depicts a plurality of particles including an electroactive material; FIG. 3B depicts a conductive polymer being added to a solvent; FIG. 3C depicts a solution including the solvent and the conductive polymer of FIG. 3B; FIG. 3D depicts the plurality of particles of FIG. 3A being added to the solution of FIG. 3C; FIG. 3E depicts a slurry including the solution and the plurality of particles of FIG. 3D; and FIG. 3F depicts the plurality of particles coated with the conductive polymer;

FIG. 4A depicts poly(3,4-ethylenedioxythiophene) ("PEDOT"); and FIG. 4B is the depicts poly(styrenesulfonate) ("PEDOT:PSS");

FIGS. 5A-5F are photographs depicting an example method of making PEDOT:PPS-coated lithium- and manganese-rich layered cathode material ("LLC") according to various aspects of the present disclosure; FIG. 5A depicts a first solution;

FIG. 5B depicts stirring the first solution of FIG. 5A; FIG. 5C depicts particles of LLC formed after drying and then grinding the first solution of FIG. 5B; FIG. 5D depicts the LLC particles of FIG. 5C after calcining; FIG. 5E depicts a slurry including the calcined LLC particles of FIG. 5D in a solution of water, PEDOT, and PSS; and FIG. 5F depicts coated particles including the LLC having a PEDOT:PSS coating formed by drying the slurry of FIG. 5E; FIG. 6A depicts discharge capacity by cycle; and FIG. 6B depicts discharge capacity retention by cycle.

Corresponding reference numerals indicate corresponding parts throughout the several views of the drawings.

DETAILED DESCRIPTION

Figure 1:
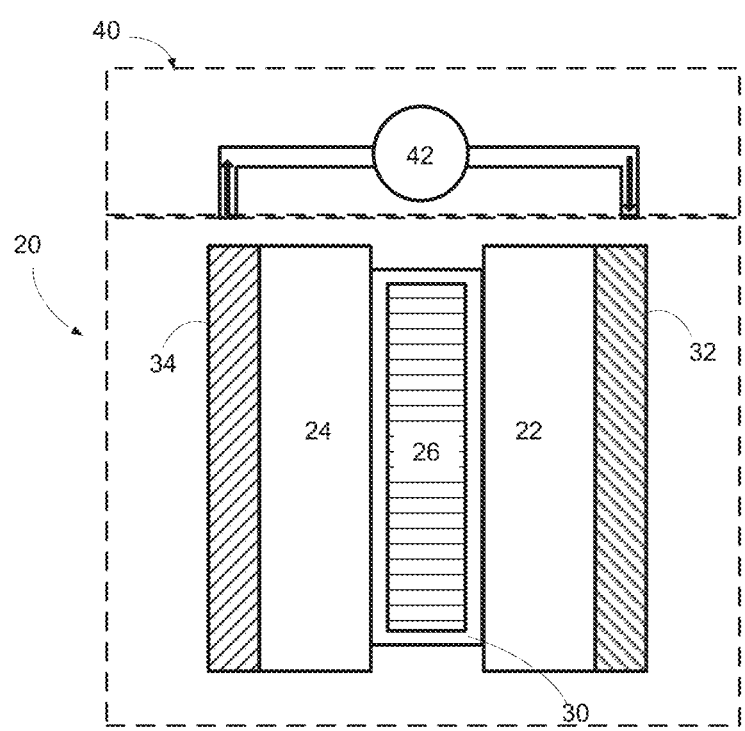
FIG. 1 is a schematic illustration of an electrochemical cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS). A rechargeable lithium-ion battery is provided that may exhibit high energy density, high capacity retention, and high Coulombic efficiency.

General Electrochemical Cell Function, Structure, and Composition

A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery, and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides, as is known in the art. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes one or more lithium salts dissolved in an organic solvent or a mixture of organic solvents. Numerous non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) ("LiODFB"), lithium tetraphenylborate ($LiB(C_6H_5)_4$); lithium bis-(oxalate)borate ($LiB(C_2O_4)_2$) ("LiBOB"); lithium tetrafluorooxalatophosphate ($LiPF_4(C_2O_4)$) ("LiFOP"); lithium nitrate ($LiNO_3$); lithium hexafluoroarsenate ($LiAsF_6$); lithium trifluoromethanesulfonate ($LiCF_3SO_3$); lithium bis(trifluoromethanesulfonimide) ($LiN(CF_3SO_2)_2$) ("LITFSI"); lithium fluorosulfonylimide ($LiN(FSO_2)_2$) ("LIFSI"); and combinations thereof. In certain variations, the electrolyte 30 may include about a 1 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane ("DME," e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane ("DMP"), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane ("DME"), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate ("EC"), propylene carbonate ("PC"), butylene carbonate) and acyclic carbonates (e.g., dimethyl carbonate ("DMC"), diethyl carbonate ("DEC"), ethyl methyl carbonate ("EMC"), and fluoroethylene carbonate ("FEC"). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid-state electrolyte, it may include a composition selected from the group consisting of: $LiTi_2(PO_4)_3$, $LiGe_2(PO_4)_3$, $Li_7La_3Zr_2O_{12}$, $Li_{3x}La_{2/3-x}TiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene "PP", or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate ("PET"), polyvinylidene fluoride ("PVDF"), polyamide (nylons), polyurethanes, polycarbonates, polyesters, polyetheretherketones ("PEEK"), polyethersulfones ("PES"), polyimides ("PI"), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (" "), polystyrene copolymers, polymethylmethacrylate ("PMMA"), polysiloxane polymers (e.g., polydimethylsiloxane ("PDMS")), polybenzimidazole ("PBI"), polybenzoxazole ("PBO"), polyphenylenes, polyarylene ether ketones, polyperfluorocyclobutanes, polyvinylidene fluoride copolymers (e.g., PVDF-hexafluoropropylene or PVDF-HFP), and polyvinylidene fluoride terpolymers, polyvinylfluoride, liquid crystalline polymers (e.g., VECTRAN™ (Hoechst AG, Germany) and ZENITE® (DuPont, Wilmington, DE)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include $LiTi_2(PO_4)_3$, $Li_{1.3}Al_{0.3}Ti_{1.7}(PO_4)_3$ (LATP), $LiGe_2(PO_4)_3$, $Li_7La_3Zr_2O_{12}$, $Li_{3x}La_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Positive Electrode

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

Two exemplary common classes of known electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ ("LMO") and lithium manganese nickel oxide $LiMn_{1.5}Ni_{0.5}O_4$ (" "). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (e.g., $LiNi_{0.6}Mn_{0.2}Co_{0.2}O_2$, $LiNi_{0.7}Mn_{0.2}Co_{0.1}O_2$, $LiNi_{0.8}Mn_{0.1}Co_{0.1}O_2$, and/or $LiMn_{0.33}Ni_{0.33}Co_{0.33}O_2$), a lithium nickel cobalt metal oxide ($LiNi_{(1-x-y)}Co_xM_yO_2$), where $0<x<1$, $0<y<1$ and M may be Al, Mg, Mn, or the like. Other known lithium-transition metal compounds such as lithium iron phosphate ($LiFePO_4$), lithium iron fluorophosphate ($Li_2FePO_4F$), or lithium Manganese iron phosphate ($LiMnFePO_4$) can also be used. In certain aspects, the positive electrode 24 may include an electroactive material that includes manganese, such as lithium manganese oxide ($Li_{(1+x)}Mn_{(2-x)}O_4$), and/or a mixed lithium manganese nickel oxide ($LiMn_{(2-x)}Ni_xO_4$), where $0 \leq x \leq 1$. In a lithium-sulfur battery, positive electrodes may have elemental sulfur as the active material or a sulfur-containing active material.

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include PVDF, poly(vinylidene chloride) ("PVC"), poly((dichloro-1,4-phenylene)ethylene), carboxymethoxyl cellulose ("CMC"), nitrile butadiene rubber ("NBR"), fluorinated urethanes, fluorinated epoxides, fluorinated acrylics, copolymers of halogenated hydrocarbon polymers, epoxides, ethylene propylene diamine termonomer rubber ("EPDM"), hexafluoropropylene ("HFP"), ethylene acrylic acid copolymer ("EAA"), ethylene vinyl acetate copolymer ("EVA"), EAA/EVA copolymers, PVDF/HFP copolymers, lithium polyacrylate ("LiPAA"), sodium polyacrylate ("NaPAA"), sodium alginate, lithium alginate, or a combination thereof.

The positive electroactive material loading in the positive electrode 24 can be large, such as greater than about 80% by weight. For example, the binder can be present at a level of greater than or equal to about 1% by weight to less than or equal to about 20% by weight, optionally greater than or equal to about 1% by weight to less than or equal to about 10% by weight, optionally greater than or equal to about 1% to less than or equal to about 8% by weight, optionally greater than or equal to about 1% by weight to less than or equal to about 6% by weight, optionally greater than or equal to about 1% by weight to less than or equal to about 7% by weight, optionally greater than or equal to about 1% by weight to less than or equal to about 5% by weight, or optionally greater than or equal to about 1% by weight to less than or equal to about 3% by weight.

Electrically conductive materials may include graphite, other carbon-based materials, conductive metals, or conductive polymer particles. Carbon-based materials may include, by way of non-limiting example, particles of KETJEN® black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15% by weight, optionally less than or equal to about 10% by weight, or optionally greater than or equal to about 0.5% by weight to less than or equal to about 8% by weight. While the supplemental electrically conductive compositions may be described as powders, these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \leq x \leq 3$, such as $Li_4Ti_5O_{12}$ ("LTO").

In certain aspects, the negative electrode 22 may include lithium, and in certain variations metallic lithium and the lithium-ion battery 20. The negative electrode 22 may be a lithium metal electrode ("LME"). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material selected from the group consisting of: PVDF, EDPM rubber, CMC, an NBR, LiPAA, NaPAA, sodium alginate, lithium alginate, or a combination thereof. Suitable additional electrically conductive materials may include carbon-based material or a conductive polymer. Carbon-based materials may include by way of example, particles of KETJEN® black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode 22 may include about 50-100% by weight of an electroactive material (e.g., lithium particles or a lithium foil), optionally greater than or equal to about 30% by weight of an electrically conductive material, and a balance binder.

Coated Positive and Negative Electroactive Materials

Lithium- and manganese-rich layered electroactive materials have high specific capacity. However, practical applications of these electroactive materials in electrochemical cells, such as lithium-ion batteries, are hindered by irreversible capacity loss and poor cycling stability. The capacity loss and poor cycling stability are believed to be caused by crystal and interfacial structural instability under aggressive electrochemical and thermal driving forces.

Capacity loss and cycling stability may be improved by coating particles of the electroactive material with a conductive polymer. The conductive polymer coating may reduce or prevent chemical interaction between the electroactive material and the electrolyte while allowing transport of lithium ions and electrons. Such conductive polymer coatings may be applied to electroactive materials by oxidative chemical vapor deposition ("OCVD"); however, OCVD is a complex process requiring specialized equipment.

In various aspects, the present disclosure provides a method of applying conductive polymer coatings to electroactive materials. The method generally includes preparing a solution of a solvent and a polymer, adding an electroactive material to the solvent to form a slurry, and drying the slurry to form conductive-polymer-coated electroactive material particles. In certain aspects, the method may further include forming the electroactive material and/or forming an electrode including the conductive-polymer-coated electroactive material. The method may be simple, such that it can be performed quickly using standard equipment that is readily available. In certain aspects, the electroactive material is a lithium- and/or manganese-rich positive electroactive material and the conductive coating includes poly(3,4-ethylenedioxythiophene):poly(styrenesulfonate) ("PEDOT:PSS").

Figure 2:
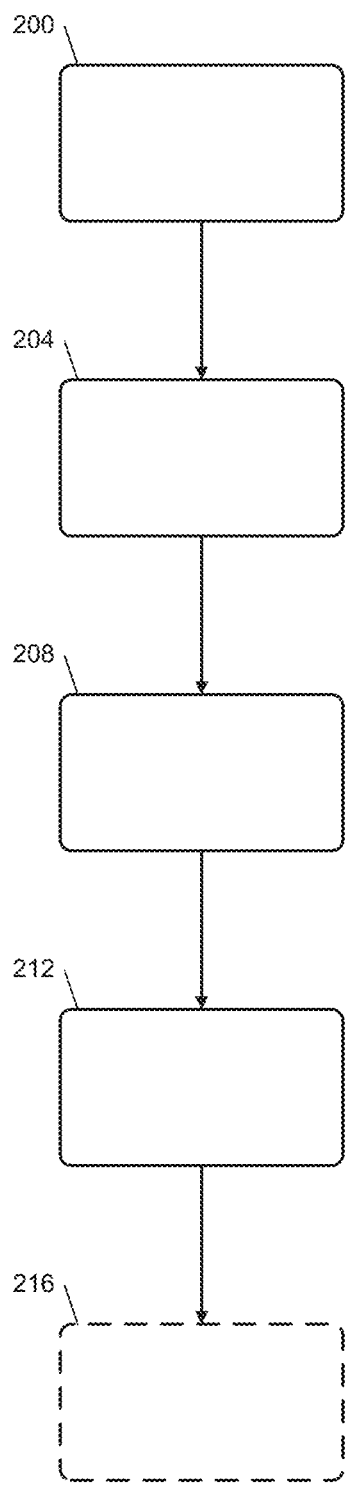
FIG. 2 is a flowchart depicting a method of preparing a conductive-polymer-coated electroactive material according to various aspects of the present disclosure.

With reference to FIG. 2, a method of preparing a conductive-polymer-coated electroactive material according to various aspects of the present disclosure is provided. The method generally includes providing an electroactive material at 200, preparing a solution including a solvent and a conductive polymer at 204, preparing a slurry including the solution and the electroactive material at 208, drying the slurry to form a conductive-polymer-coated electroactive material at 212, and optionally forming an electrode including the conductive-polymer-coated electroactive material at 216.

At 200, the method includes providing an electroactive material. Referring to FIG. 3A, in certain aspects, the method includes providing a plurality of particles 300 including the electroactive material. The plurality of particles 300 may define an average particle size of greater than or equal to about 0.05 μm, optionally greater than or equal to about 0.1 μm, optionally greater than or equal to about 0.5 μm, optionally greater than or equal to about 1 μm, optionally greater than or equal to about 5 μm, optionally greater than or equal to about 10 μm, optionally greater than or equal to about 15 μm, optionally greater than or equal to about 20 μm, or optionally greater than or equal to about 25 μm. The average particle size may be less than or equal to about 30 μm, optionally less than or equal to about 25 μm, optionally less than or equal to about 20 μm, optionally less than or equal to about 15 μm, optionally less than or equal to about 10 μm, optionally less than or equal to about 5 μm, optionally less than or equal to about 1 μm, optionally less than or equal to about 0.5 μm, or optionally less than or equal to about 0.1 μm. In certain aspects, the average particle size is greater than or equal to about 0.1 μm to less than or equal to about 30 μm.

The electroactive material may be a positive electroactive material (i.e., a cathode material) or a negative electroactive material (i.e., an anode material). The positive electroactive material may include a lithium nickel manganese cobalt oxide ($LiNiCoMnO_2$) ("NMC"); a lithium- and manganese-rich layered cathode material ("LLC") (e.g., $xLi_2MnO_3$-$(1-x)LiMO_2$, M=Mn, Ni, Co, x=0.05-0.95, for example, x=0.1, x=0.2, x=0.3, x=0.4, x=0.5, x=0.6, x=0.7, x=0.8); lithium iron phosphate ($LiFePO_4$) ("LFP"); lithium manganese iron phosphate ($LiMn_xFe_{1-x}(PO_4)$) ("LMFP"), $Li(Ni_xMn_yCo_zAl_p)O_2$, where $0 \leq x \leq 1$, $0 \leq y \leq 1$, $0 \leq z \leq 1$, $0 \leq p \leq 1$, $x+y+z+p=1$ ("NCMA"), LMO, or any combination thereof. The negative electroactive material may include silicon, silicon monoxide, graphite, or any combination thereof.

Returning to FIG. 2, providing the electroactive material at 200 may include preparing the electroactive material. Preparing the electroactive material may include preparing a solution of a solvent and electroactive material precursors; concurrently heating and stirring the solution until a wet, foam-like solid is formed; drying the wet foam-like solid, grinding the dried foam-like solid to form a plurality of particles having a desired particle size; and calcining the plurality of particles to form the electroactive material.

In certain aspects, the electroactive material precursors include metal nitrates (e.g., $Ni(NO_3)_2$, $Mn(NO_3)_2$, $LiNO_3$) and citric acid. The solvent may include water. The metal nitrates may be present in the water in an amount greater than or equal to about 0.5 weight percent to less than or equal to about 60 weight percent. The citric acid may be present in the water in an amount greater than or equal to about 1 weight percent to less than or equal to about 60 weight percent.

The solution may be stirred at a first temperature for a first duration. The first temperature may be greater than or equal to about 55° C. to less than or equal to about 100° C., or optionally greater than or equal to about 95° C. to less than or equal to about 100° C.). The first duration may be greater than or equal to about 60 minutes to less than or equal to about 600 minutes. After heated stirring, a foam-like, wet solid is formed.

The foam-like wet solid is dried at a second temperature for a second duration. The second temperature may be greater than or equal to about 150° C. to less than or equal to about 700° C., or optionally about 300° C. The second duration may be greater than or equal to about 30 minutes to less than or equal to about 600 minutes. The drying may be performed using a furnace, by way of example.

The dried, foam-like solid is ground to form a plurality of particles having a desired size. The grinding may include use of a pestle, ball milling equipment, or a combination thereof.

The plurality of particles are calcined at a third temperature for a third duration to form the electroactive material. The third temperature may be greater than or equal to about 750° C. to less than or equal to about 1000° C. The third duration may be about 2 hours to less than or equal to about 40 hours, or optionally about 20 hours. The calcining may be performed in air. The electroactive material may include a mixture of NiO, $MnO_2$, and $Li_2O$, by way of example.

At 204, the method includes preparing a solution including a solvent and a conductive polymer. With reference to FIGS. 3B-3C, a conductive polymer 310 may be added to a solvent 312 (or the solvent 312 may be added to the conductive polymer 310) to form a solution 314. The conductive polymer 310 may be a solid prior to being dissolved in the solvent 312. The conductive polymer 310 may be present in the solution 314 at greater than or equal to about 0.1 weight percent, greater than or equal to about 0.5 weight percent, optionally greater than or equal to about 1 weight percent, optionally greater than or equal to about 2 weight percent, optionally greater than or equal to about 5 weight percent, optionally greater than or equal to about 10 weight percent, optionally greater than or equal to about 15 weight percent, optionally greater than or equal to about 20 weight percent, or optionally greater than or equal to about 25 weight percent. The conductive polymer 310 may be present in the solution 314 at less than or equal to about 30 weight percent, optionally less than or equal to about 25 weight percent, optionally less than or equal to about 20 weight percent, optionally less than or equal to about 15 weight percent, optionally less than or equal to about 10 weight percent, optionally less than or equal to about 5 weight percent, optionally less than or equal to about 2 weight percent, or optionally less than or equal to about 1 weight percent. In certain aspects, the conductive polymer 310 is present in the solution 314 at greater than or equal to about 0.1 weight percent to less than or equal to about 30 weight percent, or optionally greater than or equal to about 0.5 weight percent to less than or equal to about 10 weight percent.

The solvent 312 may include water and/or an organic solvent, such as ethanol, methanol, propanol, or a combination thereof. In certain aspects, the solvent 312 is water. The conductive polymer may include polypyrrole, polyaniline, polythiophene, poly(3,4-ethylenedioxythiophene) ("PEDOT"), PEDOT:PSS (i.e., a mixture of PEDOT and PSS), copolymers thereof, derivatives thereof, and combinations thereof. In certain aspects, the conductive polymer has a conductivity of greater than or equal to about 1 S/cm, optionally greater than or equal to about 5 S/cm, optionally greater than or equal to about 10 S/cm, optionally greater than or equal to about 25 S/cm, optionally greater than or equal to about 50 S/cm, optionally greater than or equal to about 100 S/cm, optionally greater than or equal to about 150 S/cm optionally greater than or equal to about 200 S/cm optionally greater than or equal to about 300 S/cm, or optionally greater than or equal to about 400 S/cm. The conductivity may be less than or equal to about 500 S/cm, optionally less than or equal to about 400 S/cm, optionally less than or equal to about 300 S/cm, optionally less than or equal to about 200 S/cm, optionally less than or equal to about 150 S/cm, optionally less than or equal to about 100 S/cm, optionally less than or equal to about 50 S/cm, optionally less than or equal to about 25 S/cm, optionally less than or equal to about 10 S/cm, or optionally less than or equal to about 5 S/cm.

Figure 4A:
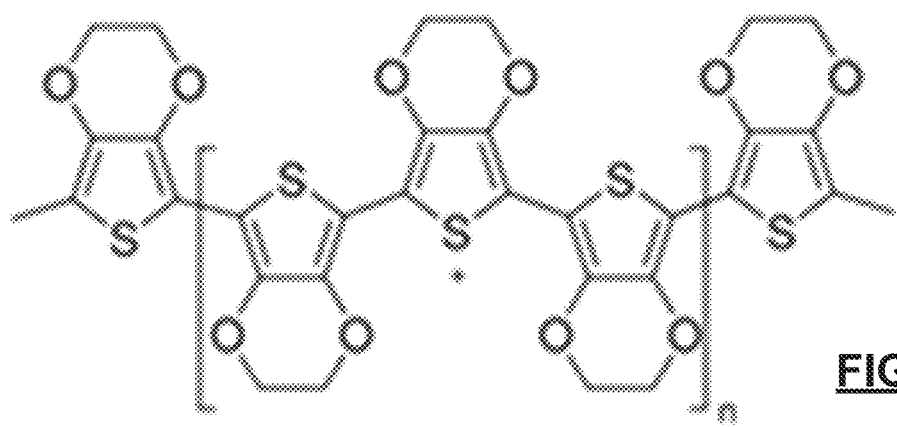
FIGS. 4A-4B are chemical structures related to poly(3,4-ethylenedioxythiophene):poly(styrenesulfonate) ("PEDOT:PSS") conductive polymer.
Figure 4B:
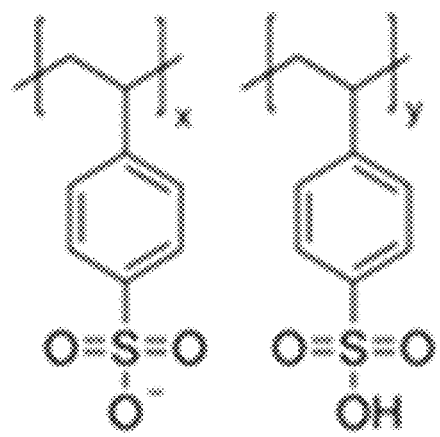

In certain aspects, the conductive polymer 310 may include the PEDOT:PSS. With reference to FIGS. 4A-4B, chemical structures for PEDOT and PSS, respectively, are provided. A weight ratio of PEDOT to PSS may be optimized to achieve a desired conductivity and/or stretchability. The weight ratio of PEDOT to PSS may greater than or equal to about 0.1, optionally greater than or equal to about 0.5, optionally greater than or equal to about 1, optionally greater than or equal to about 2, optionally greater than or equal to about 5, optionally greater than or equal to about 8, or optionally greater than or equal to about 10. The weight ratio may be less than or equal to about 10, optionally less than or equal to about 8, optionally less than or equal to about 5, optionally less than or equal to about 2, optionally less than or equal to about 1, or optionally less than or equal to about 0.5. In certain aspects, the weight ratio is greater than or equal to about 0.1 to less than or equal to about 10.

Returning to FIGS. 3B-3C, in certain aspects, preparing the solution at 204 (FIG. 2) may further include combining an additive 316 with the solvent 312 and the conductive polymer 310. The additive 316 may be configured to increase a conductivity and/or stretchability of the conductive polymer. The additive 316 may include 1-ethyl-3-methylimidazolium bis(trifluoromethylsulfonyl)imide, bis(trifluoromethane)sulfonimide lithium salt, 4-(3-butyl-1-imidazolio)-1-butanesulfonic acid triflate, diethylene glycol, and combinations thereof. The additive 316 may be present in the solution at greater than or equal to about 1 weight percent, optionally greater than or equal to about 5 weight percent, optionally greater than or equal to about 10 weight percent, optionally greater than or equal to about 15 weight percent, optionally greater than or equal to about 20 weight percent, or optionally greater than or equal to about 25 weight percent. The additive may be present at less than or equal to about 30 weight percent, optionally less than or equal to about 25 weight percent, optionally less than or equal to about 20 weight percent, optionally less than or equal to about 15 weight percent, optionally less than or equal to about 10 weight percent, or optionally less than or equal to about 5 weight percent. In certain aspects, the additive may be present at greater than or equal to about 1 weight percent to less than or equal to about 30 weight percent.

Returning to FIG. 2, at 208, the method includes preparing a slurry including the solution and the electroactive material. With reference to FIGS. 3D-3E, the plurality of particles 300 including the electroactive material may be added to the solution 314 (or the solution 314 added to the plurality of particles 300) to form a slurry 320. The electroactive material may be present in the slurry at greater than or equal to about 10 weight percent, optionally greater than or equal to about 20 weight percent, optionally greater than or equal to about 30 weight percent, optionally greater than or equal to about 40 weight percent, optionally greater than or equal to about 50 weight percent, optionally greater than or equal to about 60 weight percent, or optionally greater than or equal to about 70 weight percent. The electroactive material may be present in the slurry at less than or equal to about 80 weight percent, optionally less than or equal to about 70 weight percent, optionally less than or equal to about 60 weight percent, optionally less than or equal to about 50 weight percent, optionally less than or equal to about 40 weight percent, optionally less than or equal to about 30 weight percent, or optionally less than or equal to about 20 weight percent. In certain aspects, the electroactive material is present in the slurry 320 in an amount greater than or equal to about 10 weight percent to less that nor equal to about 80 weight percent.

Preparing the slurry at 208 (FIG. 2) may include stirring and/or heating the slurry. The slurry 320 may be stirred for greater than or equal to about 2 hours, optionally greater than or equal to about 6 hours, optionally greater than or equal to about 10 hours, optionally greater than or equal to about 14 hours, or optionally greater than or equal to about 18 hours. The slurry 208 may be stirred for less than or equal to about 20 hours, optionally less than or equal to about 16 hours, optionally less than or equal to about 12 hours, optionally less than or equal to about 8 hours, or optionally less than or equal to about 4 hours. In certain aspects, the slurry may be stirred for a duration of greater than or equal to about 2 hours to less than or equal to about 20 hours. Concurrently with the stirring, the slurry may be heated to a temperature of greater than or equal to about 60° C., optionally greater than or equal to about 65° C., optionally greater than or equal to about 70° C., optionally greater than or equal to about 75° C., optionally greater than or equal to about 80° C., optionally greater than or equal to about 85° C., or optionally greater than or equal to about 90° C. The temperature may be less than or equal to about 95° C., optionally less than or equal to about 90° C., optionally less than or equal to about 85° C., optionally less than or equal to about 80° C., optionally less than or equal to about 75° C., optionally less than or equal to about 70° C., or optionally less than or equal to about 65° C. In certain aspects, the temperature may be greater than or equal to about 60° C. to less than or equal to about 95° C. In certain aspects, the conductive polymer 310 is cross-linked during formation of the slurry 320, such as via electrostatics.

Returning to FIG. 2, at 212, the slurry is dried to form a conductive-polymer-coated electroactive material. The drying may include spray drying, rotavapor (also referred to as "rotary evaporator" or "rotavap" drying), vacuum drying, or a combination thereof. With reference to FIG. 3F, the drying yields a conductive-polymer-coated electroactive material 330. The conductive-polymer-coated electrode material 330 includes the particles 300 of electroactive material having a coating 332. The coating 332 includes the conductive polymer 310.

In certain aspects, the coating 332 may cover greater than or equal to about 50% of a surface 334 of each of the particles 300, optionally greater than or equal to about 60% of the surface 334, optionally greater than or equal to about 70% of the surface 334, optionally greater than or equal to about 80% of the surface 334, optionally greater than or equal to about 90% of the surface 334, or optionally greater than or equal to about 95% of the surface 334. In certain aspects, the coating 322 may define a thickness of greater than or equal to about 1 nm, optionally greater than or equal to about 5 nm, optionally greater than or equal to about 10 nm, optionally greater than or equal to about 50 nm, optionally greater than or equal to about 100 nm, optionally greater than or equal to about 200 nm, optionally greater than or equal to about 300 nm, or optionally greater than or equal to about 400 nm. The thickness may be less than or equal to about 500 nm, optionally less than or equal to about 400 nm, optionally less than or equal to about 300 nm, optionally less than or equal to about 200 nm, optionally less than or equal to about 100 nm, optionally less than or equal to about 50 nm, optionally less than or equal to about 10 nm, or optionally less than or equal to about 5 nm. In certain aspects, the thickness may be greater than or equal to about 1 nm to about 500 nm.

Returning to FIG. 2, at 216, the method may optionally include forming an electrode including the conductive-polymer-coated electroactive material 330. The electrode may be formed according to any method, such as those described below. The electrode may include a binder and optionally an electrically conductive material. In certain aspects, the binder includes PVDF, PEDOT:PSS, or a combination thereof. The electrically-conductive material may include graphite, other carbon-based materials, conductive metals, or conductive polymer particles, or combinations thereof, such as any of those described in connection with the electrodes 32, 34 of FIG. 1.

In various aspects, an electrode may be fabricated by mixing the electroactive material into a slurry with a polymeric binder compound, a non-aqueous or aqueous solvent, optionally a plasticizer, and optionally, electrically conductive particles. The slurry can be mixed or agitated, and then thinly applied to a substrate via a doctor blade and/or slot die coating. The substrate can be a removable substrate or alternatively a functional substrate, such as a current collector (such as a metallic grid or mesh layer) attached to one side of the electrode film. In one variation, heat or radiation can be applied to evaporate the solvent from the electrode film, leaving a solid residue. The electrode film may be further consolidated, where heat and pressure are applied to the film to sinter and calender it. In other variations, the film may be dried at moderate temperature to form self-supporting films. If the substrate is removable, then it is removed from the electrode film that is then further laminated to a current collector. With either type of substrate, the remaining plasticizer may be extracted prior to incorporation into the battery cell.

The electrode may include the conductive polymer in an amount greater than or equal to about 0.01 weight percent, greater than or equal to about 0.05 weight percent, optionally greater than or equal to about 0.1 weight percent, optionally greater than or equal to about 0.1 weight percent, optionally greater than or equal to about 0.5 weight percent, optionally greater than or equal to about 1 weight percent, optionally greater than or equal to about 2 weight percent, optionally greater than or equal to about 5 weight percent, or optionally greater than or equal to about 8 weight percent. The electrode may include the conductive polymer in an amount less than or equal to about 10 weight percent, optionally less than or equal to about 8 weight percent, optionally less than or equal to about 5 weight percent, optionally less than or equal to about 2 weight percent, optionally less than or equal to about 1 weight percent, optionally less than or equal to about 0.5 weight percent, optionally less than or equal to about 0.1 weight percent, or optionally less than or equal to about 0.05 weight percent. In certain aspects, the electrode includes the conductive polymer in an amount greater than or equal to about 0.05 weight percent to less than or equal to about 10 weight percent. The electrode may include the electroactive material in an amount greater than or equal to about 70 weight percent to less than or equal to about 98 weight percent. A weight ratio of the conductive polymer to the electroactive material may be greater than or equal to about 0.01 to less than or equal to about 0.3, or optionally greater than or equal to about 0.01 to about 0.1.

In various aspects, a binder for an electrode includes the conductive polymer. The conductive-polymer binder may be included in addition to a conductive-polymer coating on the electroactive material particles or as an alternative to the conductive polymer coating on the electroactive material (e.g., used to bind uncoated particles of the electroactive material). The binder may be applied to the electroactive material as a water-based slurry. In certain aspects, the electroactive material is a negative electroactive material. The negative electroactive material may include silicon, silicon monoxide, or a combination thereof, by way of example.

EXAMPLE

With reference to FIGS. 5A-5F, a conductive-polymer-coated electroactive material according to various aspects of the present disclosure is prepared.

A first electroactive material is prepared. At FIG. 5A, a solution 500 including electroactive material precursors and water is prepared. The electroactive material precursors include $LiNO_3$, $Mn(NO_3)_2$, $Ni(NO_3)_2$ and citric acid. At FIG. 5B, The solution 500 is stirred and heated to a first temperature using a hot plate stirrer 510. The first temperature is greater than or equal to about 95° C. to less than or equal to about 100° C. After heating and stirring for a first duration of about 600 minutes, a wet, foam-like solid is formed. The wet, foam-like solid is dried at a second temperature of about 300° C. for a second duration of about 300 minutes to provide a dried foam-like solid. The dried foam-like solid is ground into a plurality of particles 520 having a particle size of about 100 nm, as shown in FIG. 3C. The particles 520 are calcined in air at a third temperature of about 900° C. for a third duration of about 20 hours to form particles of the electroactive material 530, as shown in FIG. 3D. The electroactive material 530 includes LLC including $Li_{1.2}Ni_{0.3}Mn_{0.5}O_2$.

The particles of electroactive material 530 are coated with a conductive polymer. A 3 weight percent solution is prepared including water and polymers including PEDOT and PSS. As shown in FIG. 5E, a slurry 540 is formed by combining the solution with the electroactive material particles 530 (FIG. 5D). The slurry 540 is dried using a vacuum oven for about 600 minutes at about 80° C. The drying yields a PEDOT:PSS-coated electroactive material 550, as shown in FIG. 5F.

First and second positive electrodes are prepared. The first electrode includes the PEDOT:PSS-coated electroactive material 550 and a binder including PVDF. The electroactive material (LLC) 530 is present in the first electrode at about 80 weight percent. The PEDOT:PSS is present in the first electrode at about 4 weight percent. The second electrode includes an uncoated electroactive material LLC including $Li_{1.2}Ni_{0.3}Mn_{0.5}O_2$ and a binder including PVDF. The LLC is present in the second electrode at about 76 weight percent.

First and second electrochemical cells including the first and second electrodes, respectively, are prepared. Each of the first and second electrochemical cells includes a negative electrode including a negative electroactive material including lithium metal film and a binder including PVDF. Each of the electrochemical cells further includes an electrolyte including 1.2M LiPF6 in FEC/DMC (1:4 by vol) and a separator including Celgard 2300. The first and second electrochemical cells at cycled between about 2 V and about 4.7 V at a rate of C/20.

Figure 6A:
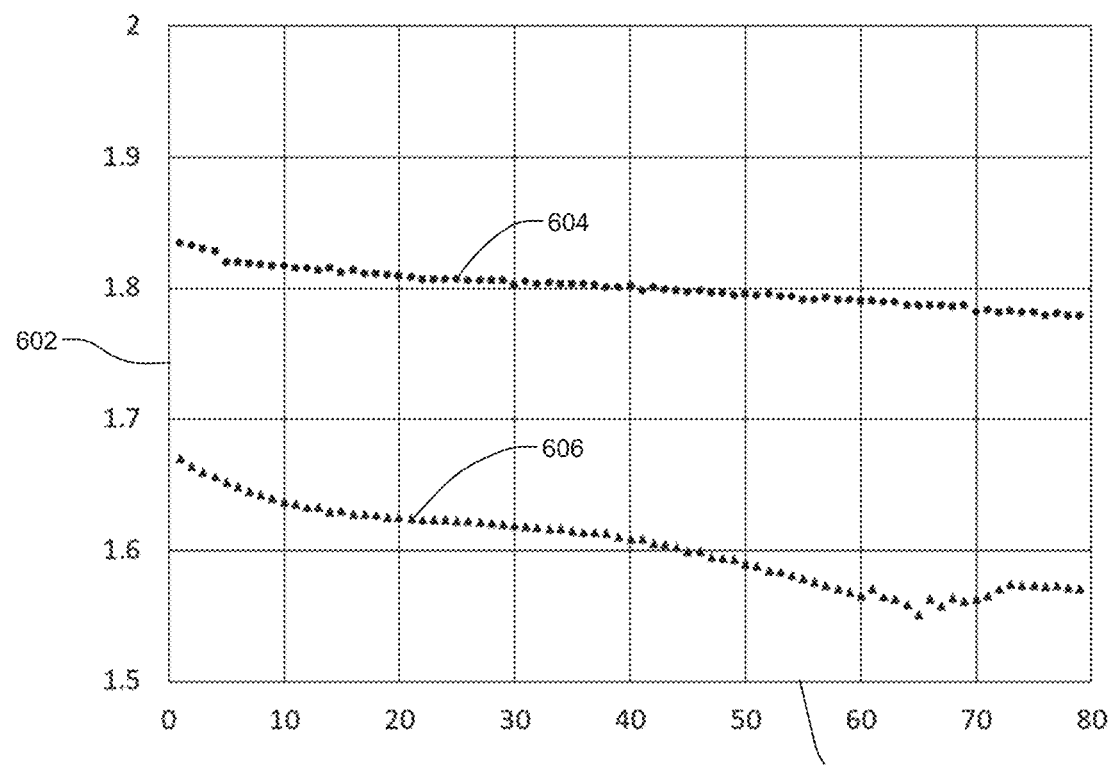
FIGS. 6A-6B are graphs depicting cycling performance an electrode including the PEDOT:PPS-coated LLC particles of FIG. 5F and uncoated LLC particles as electroactive materials.

Referring to FIG. 6A, a graph depicting discharge capacity by cycle for the first and second electrochemical cells according to various aspects of the present disclosure is provided. An x-axis 600 represents cycle number. A y-axis 602 represents discharge capacity in mAh/cm². A first curve 604 depicts discharge capacity of the first electrochemical cell and a second curve 606 represents discharge capacity of the second electrochemical cell. Over the first 80 cycles, discharge capacity of the first electrochemical cell is greater than or equal to about 1.7 mAh/cm², greater than or equal to about 1.75 mAh/cm², greater than or equal to about 1.76 mAh/cm², greater than or equal to about 1.77 mAh/cm². In contrast, the second electrochemical cell has a maximum discharge capacity of about 1.7 mAh/cm² and a minimum discharge capacity of about 1.55 mAh/cm² over the first 80 cycles.

Figure 6B:
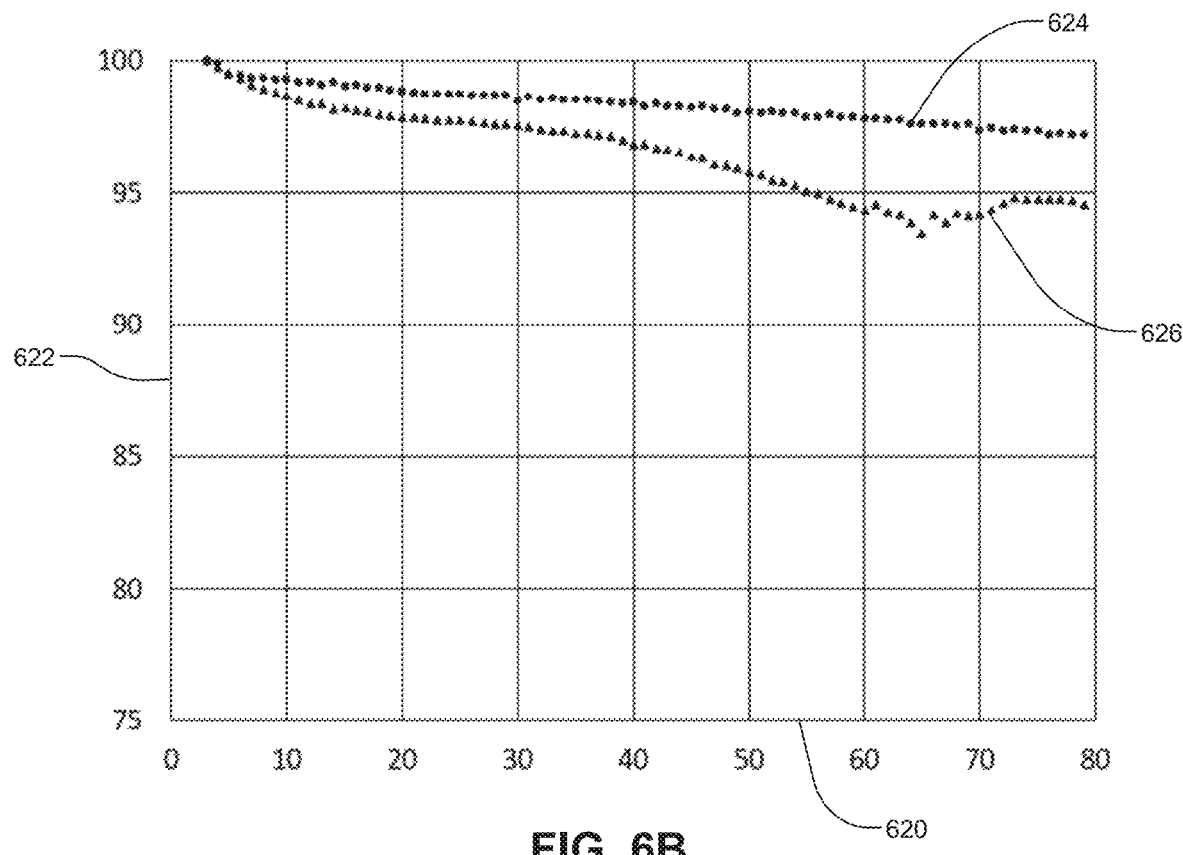

With reference to FIG. 6B, a graph depicting discharge capacity retention by cycle for the first and second electrochemical cells according to various aspects of the present disclosure is provided. An x-axis 620 represents cycle number. A y-axis 622 represents discharge capacity retention in %. A first curve 624 represents discharge capacity retention of the first electrochemical cell and a second curve 626 represents discharge capacity retention of the second electrochemical cell. After the first 80 cycles, the first electrochemical cell has a discharge capacity retention of greater than or equal to about 95%, greater than or equal to about 96%, or greater than or equal to about 97%. In contrast, after the first 80 cycles, the discharge capacity retention of the second electrochemical cell is less than about 95%. Accordingly, the conductive polymer coating facilitates improved discharged capacity retention compared to an uncoated electroactive material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preparing a coated electroactive material, the method comprising:
   coating a plurality of particles comprising an electroactive material with a conductive polymer by:
      preparing a solution that comprises water, the conductive polymer, and an additive selected from the group consisting of: 1-ethyl-3-methylimidazolium bis(trifluoromethylsulfonyl)imide, bis(trifluoromethane) sulfonimide lithium salt, 4-(3-butyl-1-imidazolio)-1-butanesulfonic acid triflate, diethylene glycol, and combinations thereof,
      forming a slurry by combining the solution with the plurality of particles, and
      drying the slurry to form the coated electroactive material, the coated electroactive material comprising the plurality of particles, each of the plurality of particles being at least partially coated with the conductive polymer, wherein
   the electroactive material is a positive electroactive material selected form the group consisting of: NMC, LLC, LFP, LMFP, NCMA, LMO, and combinations thereof,
   a weight ratio of the conductive polymer to the electroactive material is greater than or equal to about 0.01 to less than or equal to about 0.1, and
   the additive is present in the solution in an amount less than about 10 weight percent.

2. The method of claim 1, wherein the drying comprises spray drying, rotavapor drying, vacuum drying, or a combination thereof.

3. The method of claim 1, further comprising, prior to the drying, concurrently heating and stirring the slurry.

4. The method of claim 3, wherein the concurrently heating and stirring includes heating the slurry to a temperature of greater than or equal to about 60° C. to less than or equal to about 95° C. for a duration of greater than or equal to about 2 hours to less than or equal to about 20 hours.

5. The method of claim 1, further comprising preparing the electroactive material prior to the coating.

6. The method of claim 1, wherein the conductive polymer is selected from the group consisting of: polypyrrole, polyaniline, polythiophene, PEDOT, and PEDOT:PSS, copolymers thereof, derivatives thereof, and combinations thereof.

7. The method of claim 6, wherein the conductive polymer comprises the PEDOT:PSS.

8. The method of claim 7, a weight ratio of the PEDOT to the PSS is greater than or equal to about 0.1 to less than or equal to about 10.

9. The method of claim 7, wherein a conductivity of the PEDOT:PSS is greater than or equal to about 1 S/cm to less than or equal to about 500 S/cm.

10. The method of claim 1, wherein the preparing includes providing the conductive polymer in an amount greater than or equal to about 0.1 weight percent to 30 weight percent of the solution.

11. The method of claim 1, wherein the positive electroactive material comprises the LLC.

12. The method of claim 1, wherein the plurality of particles defines an average particle size of greater than or equal to about 0.05 μm to less than or equal to about 30 μm.

13. The method of claim 1, wherein the forming includes cross-linking the conductive polymer.

14. The method of claim 1, wherein the conductive polymer covers greater than or equal to about 50% of a surface area of each of the plurality of particles.

15. The method of claim 14, wherein the conductive polymer covers greater than or equal to about 90% of a surface area of each of the plurality of particles.

16. The method of claim 1, wherein the conductive polymer at least partially coating, coating, each of the plurality of particles defines a thickness of greater than or equal to about 1 nm to less than or equal to about 500 nm.

17. A method of preparing a coated electroactive material, the method comprising:
preparing a solution that comprises water, a conductive polymer, and an additive, the conductive polymer comprising PEDOT:PSS having a weight ratio of PEDOT to PSS of greater than or equal to about 0.1 to less than or equal to about 10, the conductive polymer being present in an amount greater than or equal to about 0.1 weight percent to about 30 weight percent of the solution, and the additive being selected from the group consisting of: 1-ethyl-3-methylimidazolium bis(trifluoromethylsulfonyl)imide, bis(trifluoromethane)sulfonimide lithium salt, 4-(3-butyl-1-imidazolio)-1-butanesulfonic acid triflate, diethylene glycol, and combinations thereof,
forming a slurry by combining the solution with a plurality of particles comprising LLC, and
drying the slurry to form the coated electroactive material comprising the plurality of particles, where each of the plurality of particles comprises LLC being at least partially coated with the conductive polymer, wherein
a weight ratio of the conductive polymer to the electroactive material is greater than or equal to about 0.01 to less than or equal to about 0.1, and
the additive is present in the solution in an amount less than about 10 weight percent.

18. A method of preparing an electrode including a coated electroactive material, the method comprising:
preparing a coated electroactive material, the preparing including,
providing a plurality of particles comprising an electroactive material, and
coating the plurality of particles with a conductive polymer, the coating including,
preparing a solution of water, the conductive polymer, and an additive selected from the group consisting of: 1-ethyl-3-methylimidazolium bis (trifluoromethylsulfonyl)imide, bis(trifluoromethane)sulfonimide lithium salt, 4-(3-butyl-1-imidazolio)-1-butanesulfonic acid triflate, diethylene glycol, and combinations thereof,
forming a slurry by combining the solution with the plurality of particles, and
drying the slurry to form the coated electroactive material, the coated electroactive material comprising the plurality of particles, each of the plurality of particles being at least partially coated with the conductive polymer; and
preparing an electrode including the coated electroactive material, wherein
the electroactive material is a positive electroactive material selected form the group consisting of: NMC, LLC, LFP, LMFP, NCMA, LMO, and combinations thereof,
a weight ratio of the conductive polymer to the electroactive material is greater than or equal to about 0.01 to less than or equal to about 0.1, and
the additive is present in the solution in an amount less than about 10 weight percent.

19. The method of claim 18, wherein the conductive polymer is present in the electrode in an amount greater than or equal to about 0.01 weight percent to less than or equal to about 10 weight percent.

20. The method of claim 18, wherein the electrode is configured to have a discharged capacity retention of greater than or equal to about 95% after 80 cycles when cycled in an electrochemical cell.

* * * * *